United States Patent Office 3,046,113

Patented July 24, 1962

3,046,113

LIGHT SENSITIVE MATERIAL

Maximilian Paul Schmidt and Oskar Süs, Wiesbaden-Biebrich, Germany, assignors, by mesne assignments, to Azoplate Corporation, Murray Hill, N.J.

No Drawing. Filed July 18, 1957, Ser. No. 672,565
Claims priority, application Germany June 30, 1951
38 Claims. (Cl. 96—33)

The present invention relates to light-sensitive material suitable for use in making images photomechanically, which are suitable for use in planographic and offset printing.

It has been found that images which are useful in planographic and offset printing plates can advantageously be obtained by producing on a suitable base material a light-sensitive layer comprising essentially a water-insoluble ortho-diazo phenanthrol. Ortho-quinone-diazide of the phenanthrene series is another expression for ortho-diazo phenanthrol. The light sensitive layer is exposed to light under a master and subsequently treated with alkali.

According to this process a positive image is obtained from a positive master and a negative image from a negative master.

In order to produce a printing plate the image obtained has only to be inked with greasy ink. It then is available for the production of copies in a printing machine, for example, a machine for planographic printing or planographic offset printing.

The ortho-quinone diazides which may be used according to the present invention are all compounds of this chemical constitution which are water-insoluble and which bleach considerably upon exposure to light.

The water-solubility of the ortho-diazo-phenanthrols can easily be tested by shaking the compounds (which are more or less colored) with water in a test tube at room temperature and filtering them. If the filtrate is colored the use of the tested o-quinone diazide for the purpose of the present invention should be avoided as compounds of this type do not prove practically suitable for positive printing. The capabilty of bleaching out the ortho-quinone diazide can also be tested in a simple manner by exposing them to the action of light.

Generally, ortho-diazo-phenanthrols of higher molecular weight are to be preferred in view of their low tendency to crystallize and because they yield clear, varnish-like layers which show good adhesion to the support or base material. The images produced with the aid of higher molecular ortho-diazo-phenanthrols are more greasy ink receptive so that they are more suitable for printing plates.

The tendency to crystallize can to a large extent be prevented by adding alkali-soluble resins to the ortho-diazo-phenanthrols in question and/or by mixing several o-quinone-diazides with each other.

If strongly colored images are required right after the development, suitable dyestuffs are incorporated in the light-sensitive layers or the developed diazo images are heated to elevated temperatures whereby dyestuff images are obtained which are fast to light and accept greasy ink. The addition of sensitizers or azo components can also be of advantage.

In order to get a good differentiation between the unexposed and the exposed parts of the layer in the course of the development of the image with an alkaline solution it is useful to exclude o-quinone diazides containing solubilizing groups.

For the production of the light-sensitive layers the ortho-quinone diazides to be used according to the present invention are dissolved, if necessary, with the addition of resins and/or minor quantities of fatty acids, dyestuffs, sensitizers, thiourea or azo components in suitable organic solvents, such as in dioxane and glycolmonomethyl ether. This solution is coated as a thin uniform layer onto a suitable base material, preferably onto metal plates or metal foils, e.g. aluminum foils. The light-sensitive material thus produced has excellent stability and can be stored for a long time.

The image is developed by treating the exposed material with a dilute alkaline solution, e.g. of trisodium phosphate, soda, etc., to which, if necessary, wetting agents, colloids or solvents such as alcohol may be added in low proportions.

The following formulae which are referred to in the subsequent examples are inserted in order to illustrate the present invention:

(1)

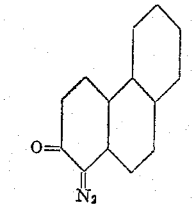

(2)

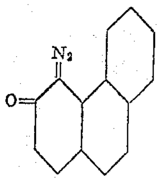

(3)

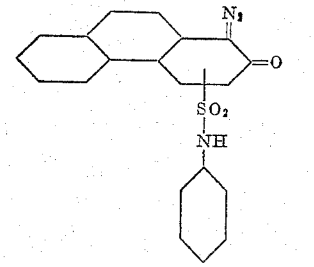

(4)

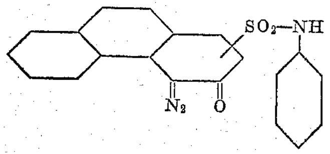

(5)

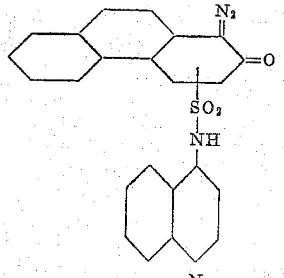

(6)

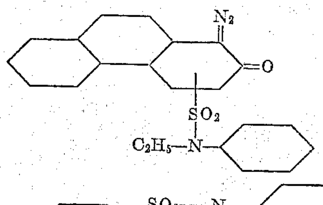

(7)

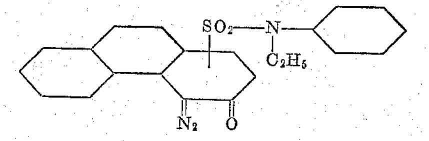

*Examples*

(1) A glycolmonomethylether solution, containing 1% of the quinone diazide of 1-amino-2-phenanthrol corresponding with Formula 1 and 0.5% of a formaldehyde-phenol-novolak, an alkali soluble phenol-formaldehyde resin which is sold under the name "Alnovol" (registered trademark in Germany), is whirlcoated onto a mechanically roughened aluminum foil with the aid of a plate whirler. The coated foil is briefly dried with the aid of a hot air current and the heating is then continued for about 5 minutes at 90° C. Thereafter the sensitized foil is exposed under a transparent master to the light of an arc lamp of 18 amp. (distance 70 cm.) for 2 minutes. In order to develop the image thus produced the foil is wiped over with a 15% trisodium phosphate solution.

If the image is to be used for printing, the exposed foil is wiped over with 1% phosphoric acid before the greasy ink is applied. Thus a positive printing plate is obtained from a positive master.

The diazo compound corresponding to Formula 1 is prepared by coupling 2-phenanthrol in a dilute alkaline solution with diazotized sulfanilic acid to form an azo dyestuff. The dyestuff which has precipitated in suspension is reduced with sodium hydrosulfite to 1-amino-2-phenanthrol (cp. Fieser, Journal of the American Chemical Society, vol. 51 (1929), page 1898). 1-amino-2-phenanthrol is diazotized in an alcoholic-hydrochloric acid solution with amyl nitrite and the yellow colored diazo compound is precipitated with water. Recrystallized from dioxane the quinone-diazide corresponding to Formula 1 melts at 125° C. under decomposition.

The same good results are obtained with the quinone diazide from the 4-amino-3-phenanthrol corresponding to Formula 2. Instead of 0.5% of the phenol-formaldehyde-novolak "Alnovol" only 0.2% of "Alnovol" is added to the sensitizing solution. When using the same light-source as described above (same amperage and distance) the time of exposure of the light-sensitive foil produced with this diazo compound amounts to about 7 minutes. The image is produced in the same manner as above described.

The ortho-quinone diazide corresponding to Formula 2 is produced from the 3-phenanthrol which is converted into the 4-amino-3-phenanthrol according to the process described for the isomeric compound (cf. Fieser, Journal of American Chemical Society, vol. 51 (1929), page 943). The hydrochloride of the 4-amino-3-phenanthrol is diazotized in glacial acetic acid with a sodium nitrite solution with addition of copper acetate. The yellow colored diazo compound can be recrystalized from dilute methanol and melts at 95–96° C. under decomposition.

(2) A one-percent solution of the diazo compound corresponding with Formula 3 in glycol-monomethyl ether is applied to a superficially roughened aluminum foil, and the coated foil is dried thoroughly. Subsequent to the exposure of the foil under a positive pattern (arc lamp of 18 amperes at a distance of 70 cm. for two minutes) the image is developed with a 0.5 percent solution of trisodium phosphate and is briefly wiped over with one percent phosphoric acid. A positive image is obtained, which takes greasy ink and can be used for printing in a customary planographic printing apparatus.

Equally favorable results can be obtained by using the diazo compounds corresponding with Formulae 4 and 5. In the case of the last-named diazo compound a one percent solution of trisodium phosphate is required for the development of the image produced.

The diazo compound corresponding with Formula 3, 1,2-diazo-phenanthrole-(2)-x-sulfo-anilide, is prepared in the following manner:

Five parts by weight of 1,2-diazo-phenanthrole-(2) (Formula 1, Example 1) are introduced into twenty parts by volume of chlorosulfonic acid under thorough cooling with ice. The solution is stirred for two hours at normal temperature, then it is left standing for five hours, and finally it is heated for one hour to 50° C. After cooling down the greenish-yellow-colored solution is poured onto ice, and 1,2-diazo-phenanthrole-(2)-x-sulfochloride precipitates in the form of a greenish-yellow sediment. 3.2 parts by weight of this raw product are suspended, without further purification, in forty parts by volume of dioxane and are mixed while stirring with two parts by volume of aniline. The sulfochloride is dissolved and aniline hydrochloride crystallizes after a few minutes. From the solution, which remains standing for twelve hours at room temperature, the anilide is precipitated by addition of water and is freed from the excess aniline by disgestion with dilute hydrochloric acid and water. The yellow-colored 1,2-diazo-phenanthrole-(2)-x-sulfo-anilide can be recrystallized from eight percent acetic acid and melts at 143°–148° C. under decomposition.

The 3,4-diazo-phenanthrole-(3)-x-sulfo-anilide (Formula 4) is prepared analogously, 3,4-diazo-phenanthrole-(3) being used as starting material. The yellow-colored diazo compound melts at a temperature of 115°–116° C. under decomposition.

In order to prepare the 1,2-diazo-phenanthrole-(2)-x-sulfo-naphthyl-amide (Formula 5), 3.2 parts by weight of 1,2-diazo-phenanthrole-(2)-x-sulfochloride are dissolved in forty parts by volume of dioxane and 1.2 parts by volume of pyridine and are caused to react with 1.4 parts by weight of $\alpha$-naphthyl-amine analogously to the method indicated for the production of the compound corresponding with Formula 3. The 1,2-diazo-phenanthrole-(2)-x-sulfo-naphthyl-amide decomposes at 156°–160° C.

(3) One part by weight of the diazo compound corresponding with Formula 6 is dissolved in hundred parts by volume of glycol-monomethyl ether, and this solution is used for coating an anodically oxidized aluminum foil. After thorough drying, the foil is exposed to light in the customary manner under a positive pattern, and the image thus produced is developed with a five percent solution of trisodium phosphate (greenish-yellow-colored positive image). Subsequent to a brief treatment with a solution containing eight percent of dextrin, one percent of phosphoric acid, and one percent of formaldehyde, the image can be inked with greasy ink and used for printing.

If the diazo compound corresponding with Formula 7 is used in the place of the above-mentioned diazo compound, a ten percent solution of trisodium phosphate is required for the development of the image. A mechanically roughened aluminum foil can be employed as the base material.

In order to prepare the diazo compound corresponding with Formula 6, three parts by weight of 1,2-diazo-phenanthrole-(2)-x-sulfochloride (compare Example 2) are suspended in thirty parts by volume of dioxane and 2.5 parts by volume of N-ethyl-aniline are dropped in while stirring. A temporary solution results. After standing for twelve hours, the reaction product is precipitated by adding water and is freed from the adhering ethyl-aniline by treating with dilute hydrochloric acid and water. The 1,2-diazo-phenanthrole-(2)-x-sulfo-N-ethyl-anilide, after recrystallization from eight percent acetic acid, melts at 81°–84° C. under decomposition.

3,4 - diazo-phenanthrole - (3) - x - sulfo-N-ethyl-anilide (Formula 7) is prepared analogously from 3,4-diazo-phenanthrole-(3)-x-sulfo-chloride. It melts at 70°–72° C. under decomposition.

(4) One side of a paper printing foil prepared according to U.S. Patent 2,534,588 and sold by the S. D. Warren Comp. of Cumberland Mills, Maine, U.S.A., is coated with an ethylene glycol monomethyl ether solution containing 1.5 percent of the diazo compound corresponding to Formula 1 and 0.75 percena of "Alnovol" (see Example 1). After thoroughly drying the coated layer, the light sensitive foil is exposed for about 1 min. under a positive pattern, using an 18 amp. arc lamp as the light source. The foil is subsequently developed by means of a 15 percent trisodium phosphate solution and then rinsed with water. Finally the image side of the foil is wiped over with a 1 percent phosphoric acid and inked with greasy ink. A positive printing plate is obtained from a positive pattern.

This application is a continuation-in-part of application Serial No. 579,703, filed April 23, 1956, which is, in turn, a continuation-in-part of application Serial No. 295,822, filed June 26, 1952, and now abandoned.

What is claimed is:

1. An ortho-diazo phenanthrol.

2. A compound having the formula $$D-SO_2-\overset{R}{\overset{|}{N}}-R_1$$

in which D is an ortho-diazo phenanthrol radical, R is selected from the group consisting of hydrogen and lower alkyl radicals, and $R_1$ is an aryl radical.

3. A compound having the formula

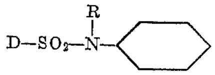

in which D is an ortho-diazo phenanthrol radical and R is selected from the group consisting of hydrogen and lower alkyl radicals.

4. A compound having the formula

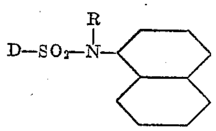

in which D is an ortho-diazo phenanthrol radical, and R is selected from the group consisting of hydrogen and lower alkyl radicals.

5. A compound having the formula

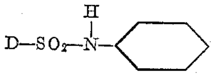

in which D is an ortho-diazo phenanthrol radical.

6. A compound having the formula

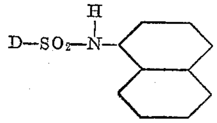

in which D is an ortho-diazo phenanthrol radical.

7. A compound having the formula

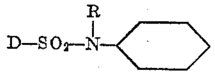

in which D is an ortho-diazo phenanthrol radical and R is a lower alkyl radical.

8. A compound having the formula

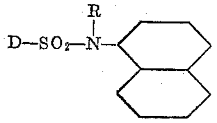

in which D is an ortho-diazo phenanthrol radical and R is a lower alkyl radical.

9. A presensitized printing plate comprising a base material coated with an ortho-diazo phenanthrol.

10. A presensitized printing plate comprising a base material coated with a compound having the formula $$D-SO_2-\overset{R}{\overset{|}{N}}-R_1$$

in which D is an ortho-diazo phenanthrol radical, R is selected from the group consisting of hydrogen and lower alkyl radicals, and $R_1$ is an aryl radical.

11. A presensitized printing plate comprising a base material coated with a compound having the formula

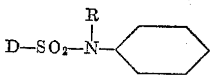

in which D is an ortho-diazo phenanthrol radical and R is selected from the group consisting of hydrogen and lower alkyl radicals.

12. A presensitized printing plate comprising a base material coated with a compound having the formula

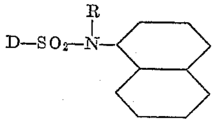

in which D is an ortho-diazo phenanthrol radical, and R is selected from the group consisting of hydrogen and lower alkyl radicals.

13. A presensitized printing plate comprising a base material coated with a compound having the formula

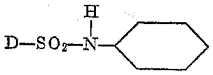

in which D is an ortho-diazo phenanthrol radical.

14. A presensitized printing plate comprising a base material coated with a compound having the formula

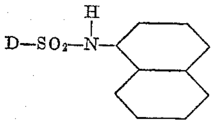

in which D is an ortho-diazo phenanthrol radical.

15. A presensitized printing plate comprising a base material coated with a compound having the formula

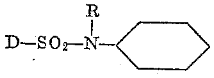

in which D is an ortho-diazo phenanthrol radical and R is a lower alkyl radical.

16. A presensitized printing plate comprising a base material coated with a compound having the formula

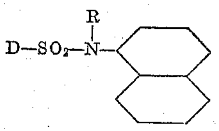

in which D is an ortho-diazo phenanthrol radical and R is a lower alkyl radical.

17. A process for developing a printing plate which comprises exposing to light under a master a plate having a layer of an ortho-diazo phenanthrol thereon to thereby form a decomposition product in the light struck areas and removing the decomposition product by treatment with a weakly alkaline solution.

18. A process for developing a printing plate which comprises exposing to light under a master a plate having a compound thereon of the formula $$D-SO_2-\overset{R}{\overset{|}{N}}-R_1$$

in which D is an ortho-diazo phenanthrol radical, R is selected from the group consisting of hydrogen and lower alkyl radicals, and $R_1$ is an aryl radical; to thereby form a decomposition product in the light struck areas and removing the decomposition product by treatment with a weakly alkaline solution.

19. A process for developing a printing plate which comprises exposing to light under a master a plate having a compound thereon of the formula

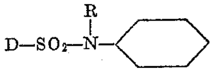

in which D is an ortho-diazo phenanthrol radical, R is selected from the group consisting of hydrogen and lower alkyl radicals; to thereby form a decomposition product in the light struck areas and removing the decomposition product by treatment with a weakly alkaline solution.

20. A process for developing a printing plate which comprises exposing to light under a master a plate having a compound thereon of the formula

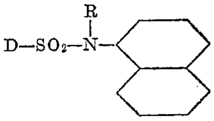

in which D is an ortho-diazo phenanthrol radical, R is selected from the group consisting of hydrogen and lower alkyl radicals; to thereby form a decomposition product in the light struck areas and removing the decomposition product by treatment with a weakly alkaline solution.

21. A process for developing a printing plate which comprises exposing to light under a master a plate having a compound thereon of the formula

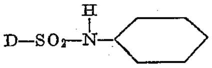

in which D is an ortho-diazo phenanthrol radical, R is selected from the group consisting of hydrogen and lower alkyl radicals; to thereby form a decomposition product in the light struck areas and removing the decomposition product by treatment with a weakly alkaline solution.

22. A process for developing a printing plate which comprises exposing to light under a master a plate having a compound thereon of the formula

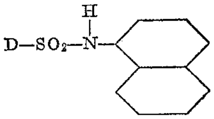

in which D is an ortho-diazo phenanthrol radical, R is selected from the group consisting of hydrogen and lower alkyl radicals; to thereby form a decomposition product in the light struck areas and removing the decomposition product by treatment with a weakly alkaline solution.

23. A process for developing a printing plate which comprises exposing to light under a master a plate having a compound thereon of the formula

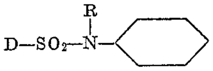

in which D is an ortho-diazo phenanthrol radical, R is selected from the group consisting of hydrogen and lower alkyl radicals; to thereby form a decomposition product in the light struck areas and removing the decomposition product by treatment with a weakly alkaline solution.

24. A process for developing a printing plate which comprises exposing to light under a master a plate having a compound thereon of the formula

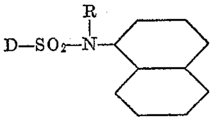

in which D is an ortho-diazo phenanthrol radical, R is selected from the group consisting of hydrogen and lower alkyl radicals; to thereby form a decomposition product in the light struck areas and removing the decomposition product by treatment with a weakly alkaline solution.

25. A compound having the formula

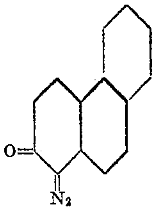

26. A compound having the formula

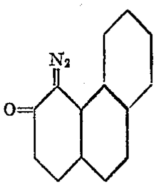

27. A compound having the formula

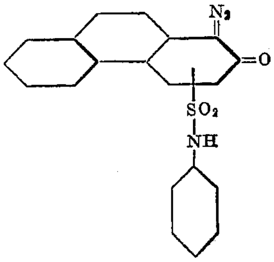

28. A compound having the formula

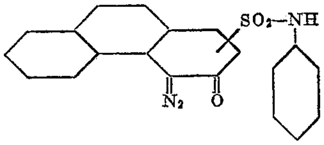

29. A compound having the formula

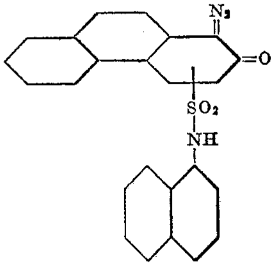

30. A compound having the formula

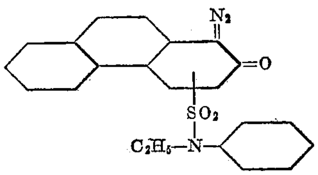

31. A compound having the formula

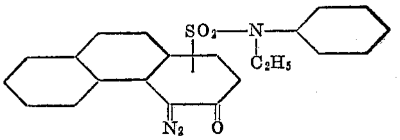

32. A presensitized printing plate comprising a base material coated with a compound having the formula

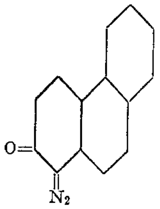

33. A presensitized printing plate comprising a base material coated with a compound having the formula

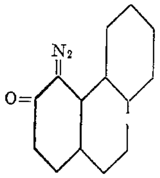

34. A presensitized printing plate comprising a base material coated with a compound having the formula

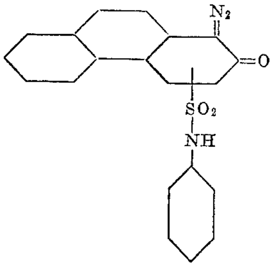

35. A presensitized printing plate comprising a base material coated with a compound having the formula

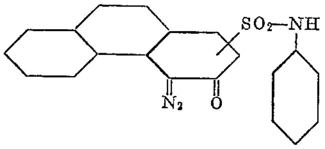

36. A presensitized printing plate comprising a base material coated with a compound having the formula

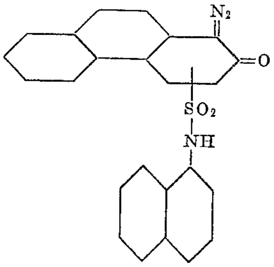

37. A presensitized printing plate comprising a base material coated with a compound having the formula

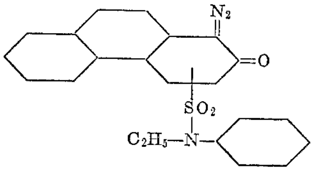

38. A presensitized printing plate comprising a base material coated with a compound having the formula

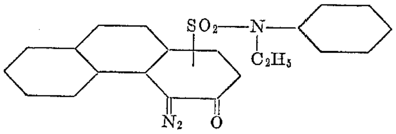

References Cited in the file of this patent

UNITED STATES PATENTS

| | | |
|---|---|---|
| 2,702,243 | Schmidt | Feb. 15, 1955 |

FOREIGN PATENTS

| | | |
|---|---|---|
| 497,135 | Belgium | Nov. 16, 1950 |
| 512,485 | Belgium | July 15, 1952 |

OTHER REFERENCES

Suter: Organic Chemistry of Sulfur, N.Y., Wiley & Sons, 3rd edition, 1948, pages 685–688. (Copy in Sci. Library.)